Jan. 19, 1954

W. H. KLIEVER 2,666,268

COMPASS SYSTEM

Filed Dec. 26, 1947

Inventor
WALDO H. KLIEVER

George H. Fisher
Attorney

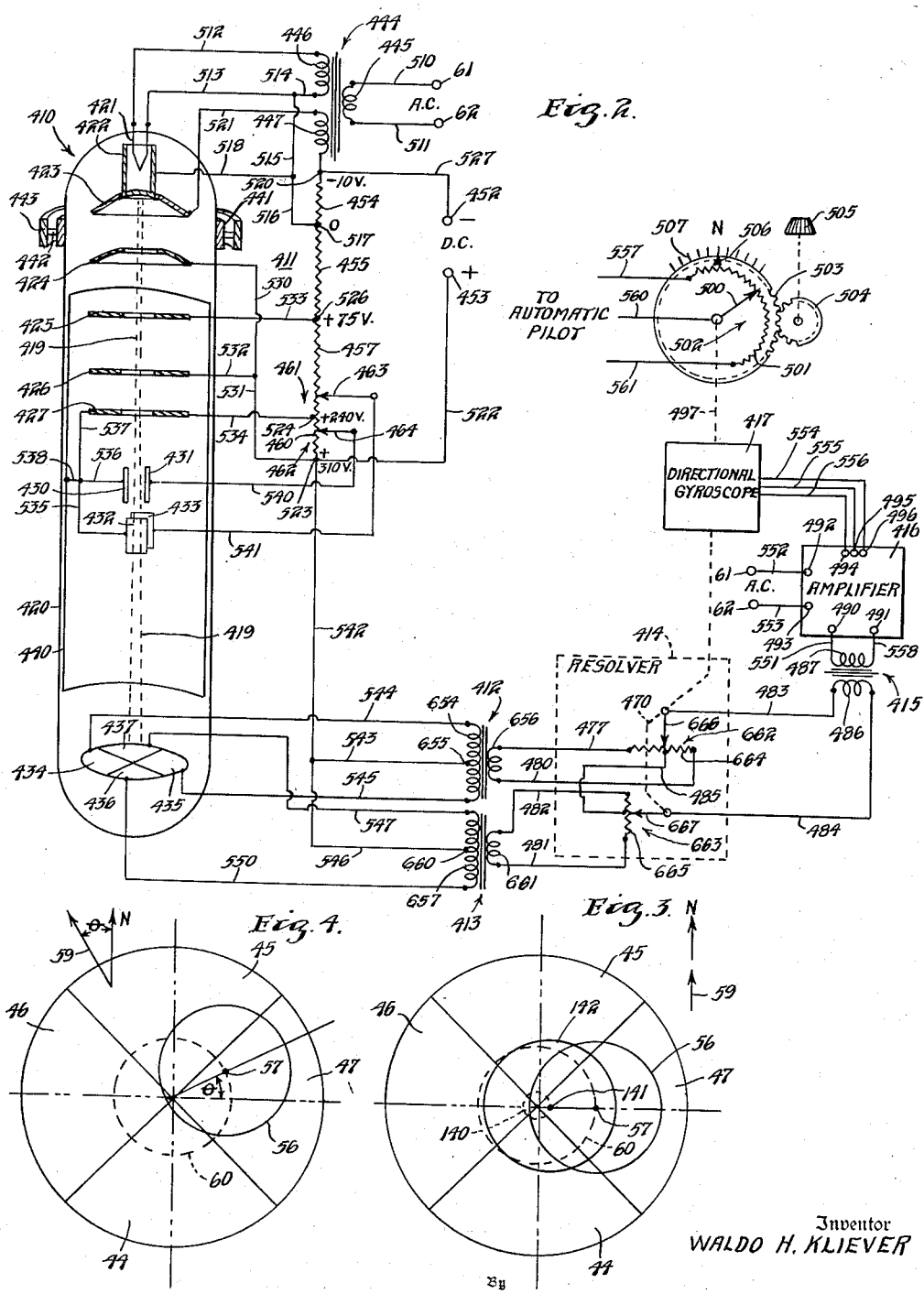

Jan. 19, 1954  W. H. KLIEVER  2,666,268
COMPASS SYSTEM
Filed Dec. 26, 1947  3 Sheets-Sheet 3
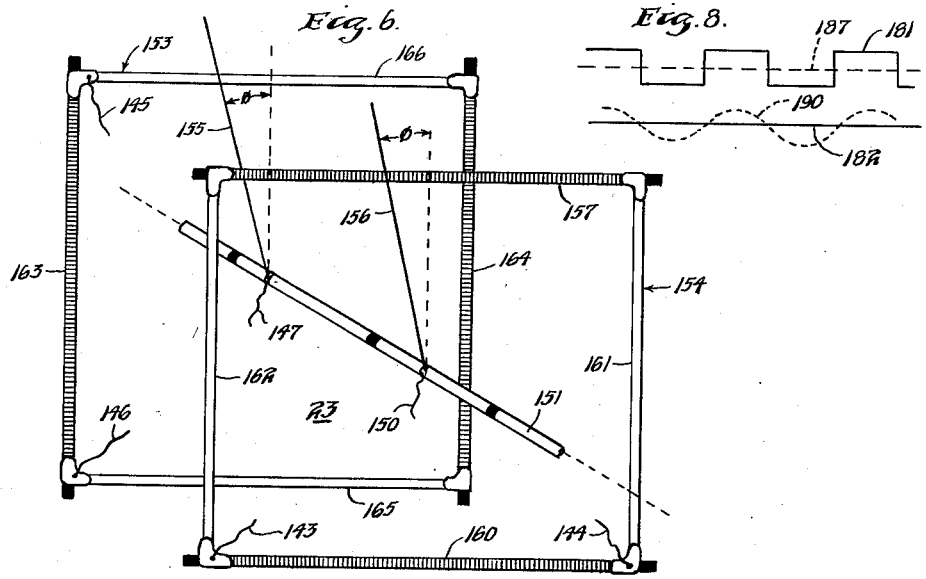
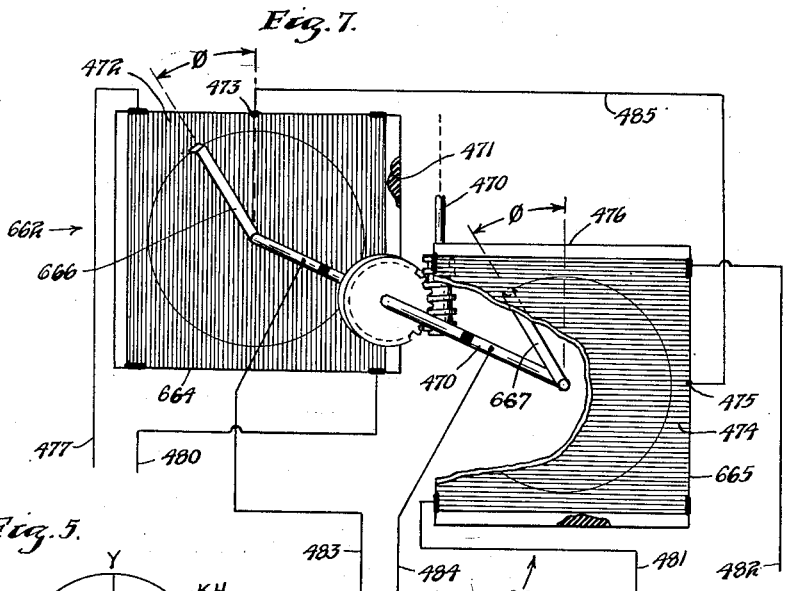
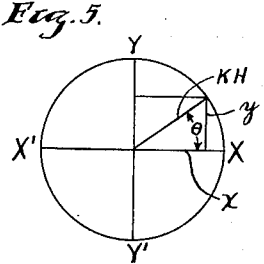
Inventor
WALDO H. KLIEVER
George H. Fisher
Attorney Patented Jan. 19, 1954

2,666,268

UNITED STATES PATENT OFFICE 2,666,268

COMPASS SYSTEM

Waldo H. Kliever, Minneapolis, Minn., assignor to Minneapolis-Honeywell Regulator Company, Minneapolis, Minn., a corporation of Delaware Application December 26, 1947, Serial No. 793,819

17 Claims. (Cl. 33—204)

This invention relates to the field of magnetic compasses, and more particularly to remote indicating or controlling compass systems in which the compass is a cathode ray tube whose beam is deflected by the earth's magnetic field.

The use of a cathode ray tube to indicate the direction of the earth's magnetic field and hence to act as a compass is known. It has been proposed to visually observe the location of the trace on the cathode ray screen as an indication of compass direction, and also to adjust the physical position of the cathode ray tube so as to bring the trace to a predetermined position on the screen, and to interpret the position taken by the tube as an indication of the direction of the earth's magnetic field. It has further been proposed to maintain the cathode ray tube with its axis vertical, and to actuate a remote indicator in accordance with the deflection of the cathode ray beam. The present invention is an improvement on known systems, and is of the type last described. It is accordingly an object of the invention to provide an improved compass system embodying a cathode ray compass and a remote motor actuated indicator.

It is another object of the invention to provide an improved angle repeating system in which the operation of the system includes as steps determining the components of the angle along a pair of axes and subdividing the components in proportion to components of a second angle along a second pair of axes, so that the subdivisions are equal when the two angles are equal.

It is another object of the invention to provide a new resistance unit in which voltages proportional to the components of an angle may be subdivided as just described.

Another object of the invention is to provide an improved aircraft compass system in which a directional gyroscope is slaved to a cathode ray compass by means of the above described angle repeating system.

Yet another object of the invention is to provide a cathode ray compass system in which the effects of noncircularity of the electron beam and of nonuniformity in amplifying and rectifying components are minimized by a degenerative feedback component effective on the deflection of the beam.

A still further object of the invention is to provide a system as described above in which the low level alternating output voltages of the cathode compass are converted to higher level unidirectional voltages for the feedback component, and then in part reconverted to alternating voltages for operating an alternating current motor actuating the remote indicating means.

Various other objects, advantages, and features of novelty which characterize my invention are pointed out with particularity in the claims annexed hereto and forming a part hereof, or will become apparent from the reading of the specification. However, for a better understanding of the invention, its advantages, and objects attained by its use, reference should be had to the subjoined drawing, which forms a further part hereof, and to the accompanying descriptive matter, in which I have illustrated and described certain preferred embodiments of my invention. In the drawing:

Figure 2 is a schematic showing of a simplified modification of the complete system;

Figures 3, 4 and 5 are views illustrative of certain details of the invention;

Figure 6 is a schematic showing of a resolver suitable for use in the practice of my invention;

Figure 7 is a schematic showing of an improved resolver adapted for use in the practice of my invention; and Figure 8 is a diagram showing certain voltage relations occurring in the structure of Figure 1.

Figure 1:
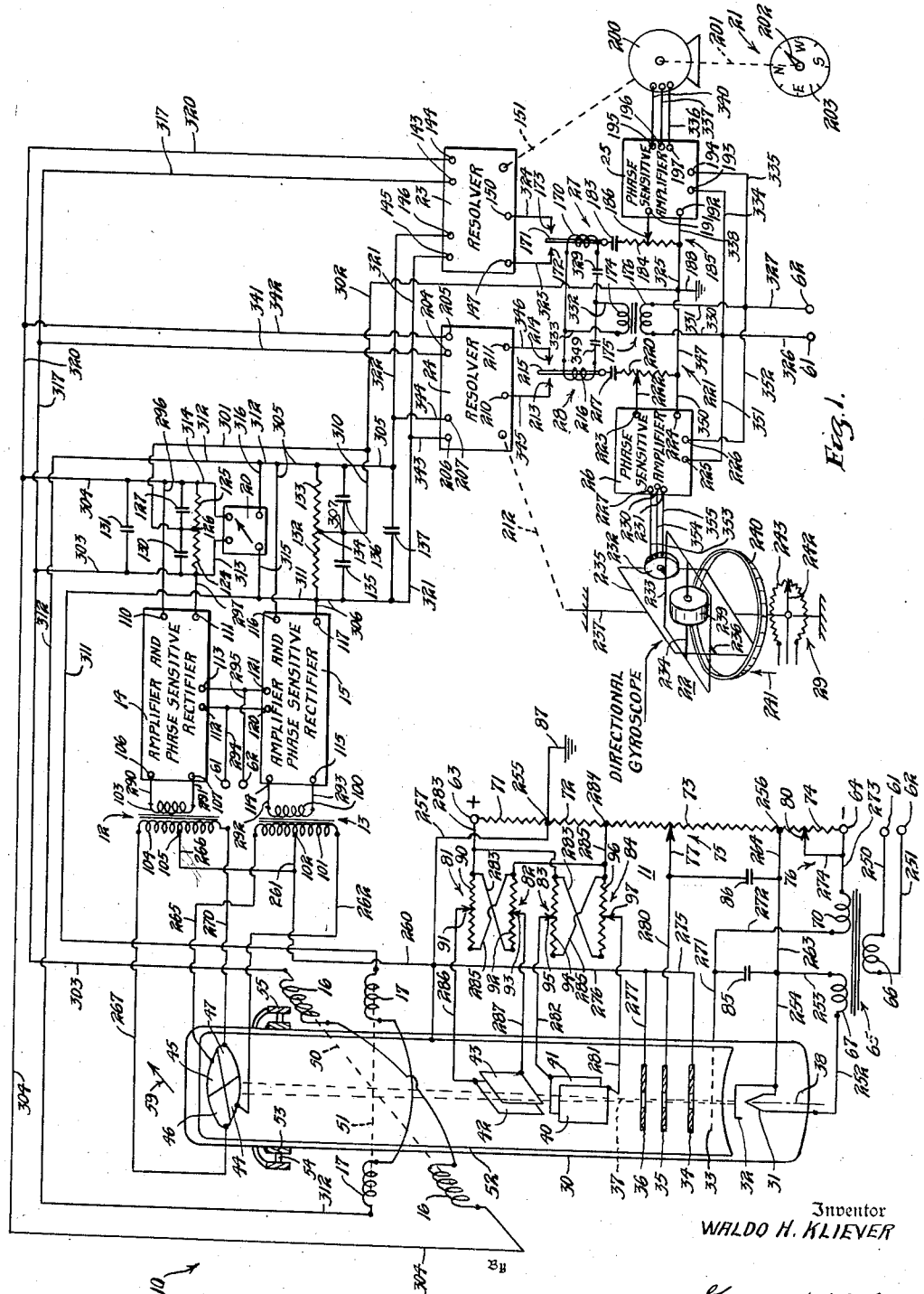
Figure 1 is a schematic showing of a complete compass system according to the invention.

Construction of the system of Figure 1

Referring now to Figure 1, there is illustrated a cathode ray tube 10 functioning as a compass and energized from a power supply 11. Electrical outputs from the cathode ray tube are impressed by transformers 12 and 13 upon a pair of electronic units 14 and 15 each of which comprises an amplifier and a phase sensitive rectifier of the type shown in Upton Patent 2,423,534 issued July 8, 1947. The outputs of units 14 and 15 are conducted to recentering coils 16 and 17 associated with cathode ray tube 10, and are also made use of to actuate instruments for performing indicating and control functions in accordance with the response of the compass to the earth's magnetic field. One of these instruments is a ratio meter indicated at 20, another is a motor actuated indicator 21, and a third is a directional gyroscope 22. The outputs of the electronic units are supplied to indicator 21 through a resolver 23, which will be described in more detail later, and a phase sensitive amplifier 25. Since the output of resolver 23 is a unidirectional voltage, an interrupter 27 is provided to convert this voltage to an alternating one. In a similar fashion directional gyroscope 22 is energized with the outputs of electronic units 14 and 15 through a resolver 24 and a phase sensitive amplifier 26, a second interrupter 28 being provided to perform the D. C. to A. C. conversion. Directional gyroscope 22 is shown as actuating a control member 29 which may be effective to control the course of a craft carrying the compass system, or to perform such other functions as may be considered desirable. The various components referred to above will now be described in more complete detail.

Cathode ray tube 10 is shown to comprise an evacuated envelope 30 enclosing a plurality of electrodes to which electrical connection may be made from outside the tube by suitable conductors passing through the envelope. Thus there is shown at 31 a heater filament for raising the temperature of a cathode 32 to a point at which it is thermoemissive. A control electrode or grid 33 is provided for controlling the flow of electrons from the cathode, and a plurality of apertured focusing and accelerating electrodes 34, 35 and 36 are also provided. Elements 31 to 36 inclusive comprise an "electron gun" which functions to direct a beam of electrons 37 along the longitudinal axis 38 of the tube. Because the apertures in electrodes 34, 35 and 36 are circular, the cross section of the beam is also circular, and since the apertures are axially aligned, the axis of the beam is very nearly aligned with the axis of the tube. However, because of the unavoidable manufacturing tolerances, it is impossible to produce in commercial quantity tubes in which the axis of the beam is exactly aligned with that of the tube. For this reason pairs of electrostatic deflecting plates—40 and 41, and 42 and 43—are provided, so that by the application of suitable voltages therebetween the position of the axis of the beam may be exactly adjusted.

At the end of cathode ray tube 10 remote from the electron gun there are located a plurality of target plates 44, 45, 46 and 47. These plates are substantially in the same plane, and take the form of mutually insulated circular quadrants. The plates are arranged in pairs which are bilaterally symmetrical about axes which are mutually perpendicular, and which are also perpendicular to the axis of the tube.

External to the tube are mounted the recentering coils 16 and 17, each coil being preferably composed of two coaxial sections, one mounted on either side of the tube. The axis 50 of coil 16 is in a plane perpendicular to the axis about which each of plates 46 and 47 is symmetrical and is parallel to deflecting plates 42 and 43. The axis 51 of coil 17 is perpendicular to the axis about which each of plates 44 and 45 is symmetrical, and is parallel to deflecting plates 40 and 41.

The inner surface of tube 10 is coated with an electrically conducting material such as carbon deposited from a colloidal suspension, as indicated at 52.

Tube 10 is received within a mounting ring 53, which is pivoted by diametrically opposite pins 54 to a Cardan ring 55. The axis of pins 54 is parallel to the axis 51 of deflecting coil 17, and Cardan ring 55 is pivotally supported by means not shown in a member rigidly connected to the aircraft or other vehicle in which the compass is mounted: the axis of pivotal movement between Cardan ring 55 and the external support is parallel to axis 50 of recentering coil 16. By reason of the location of mounting ring 53 spaced from the center of gravity of the tube, the latter is pendulously mounted so that its longitudinal axis is parallel to the direction of apparent gravity. Horizontal accelerations of the craft cause departure of the tube axis from true vertical, but these accelerations average out to zero, so the average position of the tube axis is true vertical.

The compass tube is preferably installed in the vehicle so that the heading of the vehicle coincides with axis 50, as indicated by arrow 59.

The structure thus far described functions, when suitably electrically energized and in the absence of any external magnetic field, to direct a beam of electrons 37 along the vertical axis of the tube so that it impinges upon the target plates, the center of the beam accurately coinciding with the center of the target plate assembly, and the outline of the beam being a circle, so that the areas of the several plates impinged by the beam are all equal, and equal target currents flow in circuits presently to be described. If the heading of the craft is due north, the earth's magnetic field acts upon the beam to deflect it from its central position. Since the tube is pendulously mounted so that its axis is normally vertical, the vertical component of the earth's magnetic field is not effective on the beam, but its horizontal component is effective, whether in the northern hemisphere or in the southern hemisphere, to deflect the beam toward the east. The magnitude of the horizontal component of the earth's magnetic field, and hence the amount of deflection of the beam varies with latitude, being greatest at the magnetic equator.

When the beam is deflected from its center position the impinged areas of the several target plates are no longer equal, and unequal target currents flow.

Figure 3 shows the target plates as viewed from the electron gun, and in this view the area of the plates impinged by the beam is indicated by the circle 56. It will be observed that the center 57 of the beam is displaced to the east of the center of the target plates, the amount of this displacement being determined by the horizontal component of the earth's magnetic field at the location of the compass. If the tube is now rotated in azimuth, the center of the beam describes an arc indicated by the dotted circle 60 so that for any position of the tube in azimuth, the relative areas of the plates impinged by the beam, and therefore the various target currents, are different. Thus in Figure 3 the areas of plates 44 and 45 impinged by the beam are equal, while the areas of plates 46 and 47 impinged are unequal, that of plate 47 being the greater. If the heading of the craft changes so that it is directed west of north, as shown in Figure 4, by an angle $\theta$, the center of the beam 57 is displaced around the circle 60 to a new position through an angle also equal to $\theta$.

If the radius of circle 60 is sufficiently small, the difference between the impinged areas of plates 47 and 46 varies as a cosine function of the angle $\theta$, and the difference between the impinged areas of plates 44 and 45 varies as a sine function of $\theta$. While this is not a mathematically exact relation, practical tests have shown that the approximation is sufficiently precise for the present use of the apparatus.

The various electrodes of cathode ray tube 10 are electrically energized with alternating and unidirectional voltages from power supply 11, which is shown to comprise a pair of terminals 61 and 62 energized from any suitable source of alternating voltage, and a pair of terminals 63 and 64 energized from a suitable source of unidirectional voltage in such fashion that terminal 63 is at all times maintained at a fixed positive potential with respect to terminal 64. Connected to terminals 61 and 62 is a transformer 65 which is shown to comprise a primary winding 66 and a plurality of secondary windings 67 and 70. Connected between terminals 63 and 64 are a pair of fixed resistors 71 and 72 and the windings 73 and 74 of a pair of potential dividers 75 and 76 having movable sliders 77 and 80 respectively. Power supply 11 is shown to comprise further potential dividers 81, 82, 83 and 84, a pair of filtering condensers 85 and 86, and a ground connection 87.

Potential divider 81 comprises a winding 90 and a slider 91 movable with respect thereto. Potential divider 82 comprises a winding 92 and a slider 93 movable with respect thereto. Sliders 91 and 93 are manually operable unitarily, so that both move to the left or to the right at the same time. Potential divider 83 comprises a winding 94 and a slider 95 movable with respect thereto. Potential divider 84 comprises a winding 96 and a slider 97 movable with respect thereto. Sliders 95 and 97 are also operable by manual means not shown to move unitarily to the left or to the right at the same time.

Potential dividers 81 and 82 are provided for the purpose of determining the relative potentials on deflecting plates 42 and 43. When sliders 91 and 93 are to the left of their central position, plate 43 is positive with respect to plate 42, and when the sliders are displaced in opposite direction the relative polarity of the plates is reversed. Similarly potential dividers 83 and 84 determine the relative potentials of deflecting plates 40 and 41: when sliders 95 and 97 are at the left of their center positions, plate 40 is positive with respect to plate 41, and the relative polarity is reversed when the sliders are transversed to the right of their central position.

Secondary winding 67 of transformer 65 provides voltage for heater filament 31 of the tube, and secondary winding 70 and potential divider 76 combine to maintain grid 33 at a potential, with respect to cathode 32, which alternates about a negative value determined by the position of slider 80, at the frequency of the source supplying alternating voltage to terminals 61 and 62: the amplitude of the modulating voltage is such that grid 33 never becomes positive with respect to cathode 32.

Target plates 44, 45, 46 and 47, electrodes 34 and 36, and conducting layer 52 are all maintained at ground potential, with respect to which cathode 32 is maintained highly negative, thus bringing about the proper condition for thermal emission of electrons, and their formation into a directed beam is assisted by the presence on electrode 35 of a moderate positive charge compared to that of cathode 32.

The target currents flowing in plates 44 and 45 are compared in transformer 13, which is shown to comprise a secondary winding 100 and a primary winding 101 having a center tap 102. Similarly the target currents flowing in plates 46 and 47 are compared in transformer 12, which is shown to comprise a secondary winding 103 and a primary winding 104 having a center tap 105.

Electronic unit 14 is shown to comprise a pair of input terminals 106 and 107, a pair of output terminals 110 and 111, and a pair of power terminals 112 and 113. The input terminals are energized with voltage from transformer 12 in accordance with the difference between the target currents in plates 46 and 47. Since the voltage output of transformer 12 is exceedingly minute, electronic unit 14 comprises a voltage amplifier: this is followed by a phase sensitive rectifier, so that the output at terminals 110 and 111 is a pulsating unidirectional voltage the magnitude of which is determined by the amplitude of the voltage supplied to the input terminals of the unit, and the polarity of which is determined by the phase of that input voltage compared to the voltage supplied at the power terminals 112 and 113 of the unit.

Similarly, electronic unit 15 is shown to comprise a pair of input terminals 114 and 115, a pair of output terminals 116 and 117, a pair of power terminals 120 and 121. The components of electronic unit 15 are the same as those of unit 14, and there appears at the output terminals 116 and 117 of this unit a pulsating unidirectional voltage the magnitude of which varies with the amplitude of the voltage applied to the input terminals of the unit, and the polarity of which is determined by the phase of that alternating voltage. Alternating voltage is provided to power terminals 112, 113, 120 and 121 from the source connected to terminals 61 and 62.

The pulsating unidirectional output voltage from electronic unit 14 is impressed across a pair of resistors 124 and 125 having a common terminal 126. By means of suitable filtering condensers 127, 130 and 131 the alternating components of this pulsating voltage are practically removed, the remaining voltage drop across resistors 124 and 125 being essentially a reversible unidirectional one whose magnitude varies with variation in the difference between the target currents traversing plates 46 and 47.

The output from electronic component 15 is similarly impressed across a pair of series resistors 132 and 133 having a common terminal 134, and provided with filtering condensers 135, 136 and 137, so that the voltage across resistors 132 and 133 is essentially a reversible unidirectional voltage whose magnitude is determined by the difference between the target currents in plates 44 and 45.

For purposes of definition reference should now be made to Figure 5. This figure illustrates the fact that the components $x$ and $y$, along mutually perpendicular axes $XX'$ and $YY'$, of a displacement $kH$ caused by the horizontal component of the earth's magnetic field have the respective values given below, where $\phi$ is the angle between the direction of the movement and the $x$ axis.

$$x = kH \cos \phi \qquad (1)$$

and $$y = kH \sin \phi \qquad (2)$$

For convenience in future reference, target plates 46 and 47 in Figure 1 will be referred to as the cosine plates, transformer 12 as the cosine transformer, electronic unit 14 as the cosine unit, and the filtered voltage across resistors 125 and 126 as the cosine voltage: in every case it will be understood as an abridgement of wording identifying the subject with that component of the earth's magnetic field which is maximum when the craft is heading north. Similarly the adjective "sine" will be applied to target plates 44 and 45, transformer 13, electronic unit 15, and the voltage appearing across resistors 132 and 133, identifying components which have their minimum value when the craft is heading north.

Ratio meter 20 if provided is used to give a qualitative indication of change in the heading of the craft from some arbitrarily selected value for which the meter is adjusted to give its central zero indication. The instrument functions to compare the electrical energization supplied to it from the cosine and sine voltages, and may conveniently be a differential voltmeter. If an actual ratio meter is used, its indication is directly proportional to the tangent of the angle by which the heading of the craft departs from the selected heading, since by definition the tangent of any angle is the ratio of its sine to its cosine.

The cosine voltage is applied to recentering coil 16, and the sine voltage is applied to recentering coil 17, each in a proper sense to return the beam toward the center, so as to reduce the target current difference which causes the sine and cosine voltages. The gain in the amplifiers of electronic units 14 and 15 is so adjusted as to give sine and cosine voltages of magnitudes which cause currents in coils 16 and 17 almost sufficient to return the beam to its central or no-field position. This relationship is best illustrated in Figure 3, where, it will be recalled, the craft is assumed to be heading north. The effect of the voltages fed back to coils 16 and 17, hereinafter referred to as the recentering voltages, is to greatly reduce the size of circle 60 about which the center of the beam appears to move when the tube is rotated in azimuth, so that it has a smaller value indicated by circle 140. The position of the center of the beam is indicated by reference numeral 141, and the beam in its new position by reference numeral 142.

The relationships in Figures 3 and 4 have been greatly exaggerated to make the showing clearer. In an actual embodiment of the invention the target plate circle has a diameter of 7/8 of an inch, the diameter of the beam at the target is 3/8 of an inch, the circle traced by the center of the beam without the recentering coil has a radius of 1/8 of an inch, and the circle traced by the center of the beam with the rebalancing coil has a radius of about 1/80 of an inch. Although the recentering of the beam by this means does in effect comprise a reduction of the sensitivity of the tube, this is compensated for by the increased accuracy with which the sine and cosine voltages follow their respective trigonometric functions, and by the fact that the disturbing effects of noncircularity of the beam section and non-identity of the electric units on the response of the instrument are greatly minimized.

The sine and cosine voltages are fed to a resolver 23 which is shown to comprise a pair of cosine terminals 143 and 144, a pair of sine terminals 145 and 146, a pair of output terminals 147 and 150, and a driving shaft 151. Resolver 123 is shown in detail in Figure 6 to comprise a pair of resistance units 153 and 154 with respect to which there move a pair of contacting sliders 155 and 156.

Resistance unit 154 comprises a pair of resistance members 157 and 160 and a pair of electrically conducting members 161 and 162. Each of resistance members 157 and 160 comprises a nonconducting rod carrying a winding of fine insulated wire. Members 157 and 160 are suitably mounted to form the opposite sides of a rectangular frame, of which members 161 and 162 suitably mounted comprise the other two sides. The ends of the wires comprising the windings are soldered to the conducting members to complete a closed electrical circuit, and the insulation is removed from the winding along a line so that electrical contact may be made to the winding at any point. In addition, the solder connecting the wire to the conducting member is carried along the winding toward the center thereof so that the angles subtended by the windings, at a central pivot, are both 90°, and the remaining angular space is equally divided. The windings, the conducting members, and the solder are arranged to be substantially in a common plane, and thus comprise a square with two resistance arms and two conducting arms. Slider 156 is pivoted at the center of the square, and is resiliently maintained in continuous contact with the resistance member with which it cooperates to comprise what will be referred to as the "cosine" resistor.

Slider 155 cooperates with the resistance unit 153 to comprise a "sine" resistor. The construction of resistance unit 153 is in every respect similar to that of unit 152: it is shown to comprise resistance members 163 and 164 and conducting members 165 and 166, mounted to form a square for contact by slider 155. Sliders 155 and 156 are mutually insulated, and are simultaneously operated by shaft 151. The resistance units are so mounted with respect to the sliders that when slider 156 is midway along resistance member 157, slider 155 is midway along conducting member 166: this will be referred to as the normal or zero setting of the resolver.

Suppose a voltage proportional to the cosine of an angle $\theta$ is impressed between terminals 143 and 144 so that they are respectively positive and negative, compared to a reference point, by equal amounts, and suppose a voltage proportional to the sine of the same angle $\theta$ is likewise applied between terminals 145 and 146 so that they are respectively positive and negative by equal amounts, with respect to the same point. Let the angle by which sliders 155 and 156 are displaced from the zero position be $\phi$, a counterclockwise rotation being considered positive. Then for values of $\phi$ less than 45°, slider 155 is at a potential, with respect to the reference point, of $$\frac{\sin \theta}{2}$$

and slider 156 is at a potential with respect to the reference point of $$\frac{\cos \theta \tan \phi}{2}$$

The potential difference V between the sliders is given by the equation $$V = \frac{\sin \theta}{2} - \frac{\cos \theta \tan \phi}{2}$$

When $\phi = \theta$, the second term on the right becomes $$\frac{\sin \theta}{2}$$

and $V = 0$.

For values of $\phi$ between 45° and 90°, slider 155 is at a potential with respect to the reference point of $$\frac{\sin \theta \tan (90-\phi)}{2} \text{ or } \frac{\sin \theta \cot \phi}{2}$$

and slider 156 is at a potential with respect to the reference point of $$\frac{\cos \theta}{2}$$

The potential difference V between the sliders is now given by the equation $$V = \frac{\sin \theta \cot \phi}{2} - \frac{\cos \theta}{2}$$

and becomes zero when $\theta$ equals $\phi$.

It can be shown that for any positive or negative value of $\theta$, a position of sliders 155 and 156 can be found in which $V=0$. The arrangement has a 180° ambiguity, but only two positions of the sliders giving zero output voltage can be found for any value of $\theta$, and for one of these the system as a whole is unstable. There is no tendency to instability at values for angle $\phi$ of multiples of $$\frac{\pi}{4}$$

and when $\phi$ is greater than $\theta$ the voltage difference between the sliders is always of the opposite polarity to that when $\phi$ is less than $\theta$. The output of resolver 23 is thus a unidirectional voltage the magnitude of which is zero when the shaft 152 is in angular agreement with the direction of the field.

Interrupter 27 is shown in Figure 1 to comprise an energizing winding 170, a movable contact 171, and a pair of fixed contacts 172 and 173 to which are respectively connected terminals 147 and 150 of resolver 23. Winding 170 is energized with alternating voltage of the selected frequency from the secondary winding 174 of a transformer 175 of which the primary winding 176 is energized from terminals 61 and 62 connected to the A. C. source. Movable contact 171 vibrates at the frequency of the alternating voltage supplied to the energizing winding, and makes contact first with fixed contact 172 and then with fixed contact 173. Neglecting transients, the voltage on movable contact 171 is shown as the square wave 181 in Figure 8, and has the same period as the source energizing the vibrator. It is assumed in Figure 8 that slider 155 of resolver 23 is positive with respect to slider 156: accordingly the upper limits of the wave occur when movable contact 171 engages fixed contact 172, and the lower limits of the curve occur when movable contact 171 engages fixed contact 173. If the relative polarity of sliders 155 and 156 reverses, the phase of the square wave 181 also reverses, while if sliders 155 and 156 are at the same potential, square wave 181 becomes a straight line. The voltages are all measured with respect to the reference point, which is indicated at 182 in Figure 8. Movable contact 171 is connected to the reference point through a blocking condenser 183 and the winding 184 of a voltage divider 185 having a slider 186. The reference point is maintained at ground potential by a ground connection 188.

As is well known to those skilled in the art, a voltage having the wave shape of curve 181 is comprised of a unidirectional component, indicated at 187, a first alternating component of the fundamental frequency, indicated at 190, and harmonic components having frequencies which are integral multiples of the fundamental frequency. The magnitude of the unidirectional component varies with angle $\theta$, and may be either positive or negative. For reasons presently to be discussed only the fundamental component need be considered here: of this component a variable portion determined by the setting of slider 186 is impressed upon the input of phase sensitive amplifier 25.

Amplifier 25 is shown to comprise input terminals 191 and 192, power terminals 193 and 194, and output terminals 195, 196 and 197. This amplifier is of a well known type in which the output terminals are energized in a first fashion if the voltages on the power and input terminals are in phase, and in the opposite fashion if the voltages are out of phase: alternating components of the input voltage differing materially from the power frequency are without substantial effect on the amplifier.

A split phase motor 200, which is designed for operation on alternating voltage of the frequency of the source, is energized from amplifier 25 to operate in a first direction when the output terminals of the amplifier are energized in the first fashion, and in the opposite direction when the output terminals are energized in the opposite fashion. Motor 200 drives shaft 151, which has been shown to adjust sliders 155 and 156 of resolver 23, and also drives a shaft 201 to which is fastened an index 202 which is accordingly moved with respect to a fixed index plate 203. Such gear reduction, not shown, as is desired may be provided between motor 200 and shafts 151 and 201, but the gearing must be such that the shafts rotate through equal angles for any given amount of operation of motor 200.

The general functioning of this portion of the system will now be apparent. As the cathode ray beam is deflected from a position of equal impingement of all the target plates, in response to the earth's magnetic field, voltages are impressed on resolver 23 proportional to the components of the earth's magnetic field along the longitudinal and transverse axes of the craft. If the resolver is not so set that its angle from the zero position is the same as the angle of the earth's magnetic field from the longitudinal axis of the craft, fixed contacts 172 and 173 are not at the same potential, and amplifier 25 energizes motor 200 to operate such a direction as to bring sliders 155 and 156 to the position at which they are at the same potential. When this position is reached, operation of motor 200 stops. Index 202 is set at the "North" graduation on plate 203 when the resolver is in its normal position, and the direction of operation of shaft 201 is selected so that when the motor comes to rest in any other position, index 202 indicates on disc 203 the magnetic heading of the craft.

In addition to operating motor driven indicator 21, the system is capable as previously described of stabilizing in azimuth the direction of gyroscope 22. For this purpose there is provided a second resolver 24 having cosine terminals 204 and 205, sine terminals 206 and 207, output terminals 210 and 211, and a driving shaft 212. Resolver 24 is constructed exactly like resolver 23 previously described, and energizes the fixed contacts 213 and 214 of interrupter 28, which has a movable contact 215 and an energizing winding 216. Movable contact 215 is connected to ground through a blocking condenser 217 and the winding 220 of a potential divider 221 having a slider 222, and a portion of the alternating component of the voltage across winding 220 is applied to the input terminals 223 and 224 of the second phase sensitive amplifier 26, which has power terminals 225 and 226 and output terminals 227, 230 and 231.

Amplifier 26 energizes a split phase torque motor 232 comprising a portion of directional gyroscope 22. The gyroscope includes a mounting 233 within which a rotor 239 spins about an axis 234. Mounting 233 is pivotally supported in a cardan ring 235 for pivotal movement about an axis 236, and cardan ring 235 is in turn mounted pivotally for rotation about a vertical axis 237. A graduated scale 240 is carried by cardan ring 235, for movement with respect to a fixed index 241 to give indications of azimuth. Similarly a slider 242 is carried by cardan ring 235, but insulated therefrom, and engages the winding 243 of a potential divider making up control member 29. By this means there is provided a control voltage which varies in accordance with change in the heading of the craft, since slider 242 is stabilized in azimuth by the gyroscope, and winding 243 is fastened to the craft for azimuth movement therewith. Drive shaft 212 of resolver 24 is connected to the vertical axis of gyroscope 22, so that the position of the sliders of resolver 24 is determined by the position in azimuth of the gyroscope.

It is well known that a directional gyroscope gives a much steadier indication of azimuth than does a magnetic compass, for example, because of its comparatively enormous period in azimuth. It is also known, however, that the azimuth indications of a directional gyroscope are subject to continuous slow departure from the correct value, so that for accurate navigation the directional gyroscope must be reset frequently in accordance with the indications of a magnetic compass. The causes of this precession of the gyroscope away from its original position in space have been discussed in the prior art and this discussion will not be repeated here. The prior art has also suggested the desirability of slaving a directional gyroscope to a magnetic compass, so that the actual azimuth indication will not be subject to violent fluctuations, and yet so that any sustained deviation between the indication of the gyroscope and that of the magnetic compass will be corrected by intentional precession of the gyroscope in azimuth. This precession of the gyroscope is accomplished according to the present invention by torque motor 232, which applies torque about axis 236 in one direction or the other according as the energization of terminals 227, 230 and 231 is in a first sense or in the opposite sense. Application of torque around axis 236 results in precession of the gyroscope around vertical axis 237, according to well known principles of gyroscopic operation.

The general functioning of this portion of the compass system will now be apparent. As long as the magnetic compass and the directional gyroscope are properly coordinated, the position of the sliders of resolver 24 is so related to the direction of the displacement of the beam of the cathode ray tube 10 that no voltage difference appears between fixed contacts 213 and 214, and torque motor 232 is deenergized. Any change in the heading of the craft displaces the beam of the cathode ray tube, but equally displaces the winding of resolver 24 with respect to the sliders, which are stabilized by gyroscope 22 through shaft 212, and there is still no voltage appearing between fixed contacts 213 and 214. However, should gyroscope 22 begin to drift in azimuth while the heading of the craft remains the same, the sliders of resolver 24 are moved with respect to their windings, and a voltage difference appears between fixed contacts 213 and 214. This is converted to an alternating voltage according to principles previously described, and this in turn energizes torque motor 232 in such a direction as to precess the gyroscope so that the sliders of resolver 24 are returned to a position in which the resolver gives no output voltage, and the azimuth indication of the gyroscope is at the same time corrected so that it is again correlated with the magnetic field indicated by the compass. It will be realized that the torque which torque motor 232 is capable of exerting must be so selected with respect to the inertia of the rotor spinning at its rated speed that the gyroscope will only follow the average or long term indication of compass, and will not respond to temporary or transient indications. I have found that correction of the position of shaft 212 at 4° per minute is a satisfactory rate of operation for this portion of the system.

Although shown separately for clarity of illustration, potential dividers 81, 82, 83 and 84 are in practice mounted with tube 10. This is for convenience in centering the beam, since actual field-free space is not easy to establish, while improper centering of the beam causes it to vary in deflection with change in the voltage applied to terminals 63 and 64. The centering process is carried out as follows. The tube without the rebalancing coils but with the potential dividers fixed thereto is set up in a test fixture with its axis as nearly parallel to the earth's magnetic field as can be estimated, and with test voltages on the various electrodes. The sliders 91, 93 and 95, 97 are adjusted until the spot is at the center of target plates 44, 45, 46, 47, as indicated by equal target currents. It is still possible, however, that the central position of the beam is due not entirely to the centering voltages, but in part to a residual component of the earth's magnetic field resulting from imperfect alignment with the beam axis therewith. To obviate this uncertainty, the electrode voltages are all increased sharply by increasing the voltage of the supply. If the beam is actually parallel to the earth's field, this will cause no deflection, but if there is a component of the field normal to the beam, deflection will result. The process is repeated until no change in the position of the beam takes place. Thereafter the tube may be installed in any desired position and location and connected into the system: any variation in the operating voltage impressed between terminals 63 and 64 will now be ineffective on the deflected portion of the beam.

In setting up the instrument, the cathode ray tube is mounted, in an aircraft for example, so that axis 50 is in a vertical plane parallel to the longitudinal axis, or heading, of the craft: axis 38 is vertical because of the force of gravity acting on the universally mounted pendulous tube. The craft is turned so that its longitudinal axis is in the magnetic meridian. Shaft 212 is uncoupled from the gyroscope 22, whose spinning motor is not energized, and shafts 151 and 201 are uncoupled from motor 200. Terminals 61 and 62 are connected to a source of 400 cycle, 115 volt single phase A. C., and terminals 63 and 64 are connected to a source of 450 volts D. C. so that terminal 63 is positive.

Circuit connections for the system of Figure 1

Energization of terminals 61 and 62 acts through conductors 250 and 251 to energize primary winding 66 of transformer 65, and an alternating voltage is induced in secondary winding 67 by transformer action, and applied to heater filament 31 by conductors 252, 253 and 254: in the embodiment of the invention shown in Figure 1 the filament voltage is 6.3 volts. By this means, cathode 32 is brought into thermoemissive condition.

Target plates 44, 45, 46 and 47 are maintained substantially at ground potential by being connected through circuits traced below to junction point 255, to which is also connected ground connection 87. Since cathode 32 is maintained several hundred volts negative with respect to the target plates, by being connected to junction point 256 between voltage dividers 75 and 76, and is heated to thermal emission, target currents making up the anode current of the tube flow in a plurality of circuits having electron beam 37 in common.

The first target current circuit may be traced from junction point 255 through conductors 257, 260 and 261, center tap 102, the lower half of primary winding 101, conductor 262, target plate 44, the electron beam 37, cathode 32, and conductors 254, 263 and 264 to junction point 256. A second target current circuit may be traced from junction point 255 through conductors 257, 260 and 261, center tap 102, the upper half of primary winding 101, conductor 265, target plate 45, electron beam 37, cathode 32, and conductors 254, 263 and 264 to junction point 256. It will be seen that the currents in primary winding 101 due to impingement of target plates 44 and 45 by the beam act to induce opposite fluxes in the core of transformer 13, so that when the beam impinges equally on plates 44 and 45 no resultant flux remains to induce a voltage in secondary winding 100.

A third target current circuit may be traced from junction point 255 through conductors 257, 260 and 266, center tap 105, the upper half of winding 104, conductor 267, target plate 46, electron beam 37, cathode 32, and conductors 254, 263 and 264 to junction point 256. A fourth target current circuit can be traced from junction point 255 through conductors 257, 260 and 266, center tap 105, the lower half of winding 104, conductor 270, target plate 47, electron beam 37, cathode 32, and conductors 254, 263 and 264 to junction point 256. Again no induced voltage appears in secondary winding 103 when target plates 46 and 47 are equally impinged by the beam.

Since the anode current in even a very efficient cathode ray tube is at most only a few hundred microamperes, and since normally only nearly mutually neutralizing portions of this total flow in the transformer primary windings, it is obvious that amplification of the signal must be provided. It has been considered desirable to make use of a property of the cathode ray tube to obviate the need of highly sensitive D. C. amplifiers, which are technically difficult to construct. The property referred to is that of modulation of the beam in intensity, by the application of suitable modulating voltage between the cathode and the modulating electrode, so that the target currents have alternating components which are capable of separation from the unidirectional components and of amplification in a conventional amplifier. For this purpose an alternating potential is impressed between cathode 32 and grid 33, but in order that the grid may not go positive during either half cycle of the alternating voltage, it is necessary that the latter be combined with a unidirectional voltage of a polarity to make the grid at least slightly negative at all times. The grid circuit accomplishing this modulation includes an alternating voltage induced in secondary winding 70 of transformer 65 and the unidirectional voltage drop between slider 80 of potential divider 76 and junction point 256, and may be traced from grid 33 through conductors 271 and 272, secondary winding 70, conductors 273 and 274, slider 80, the portion of winding 74 above slider 80, junction point 256, and conductors 264, 263 and 254 to cathode 33.

Condenser 85 is connected between conductors 254 and 271 to reduce the effect of harmonic or other higher frequency components of the modulating alternating voltage: its impedance is selected to be high to the signal frequency but low to its harmonics, which are thus shunted and do not significantly affect the bias voltage on the grid.

Since all electrons have the same charge, and hence repel one another, there is a tendency for the beam to scatter and become diffused. This tendency may be overcome by giving the electrons so great an axial velocity that only negligible radial movement due to mutual repulsion can take place in the brief interval during which they are passing between the cathode and the target plates. It is also desirable that the cross sectional area of the beam be as nearly circular as is possible, for reasons discussed in connection with Figures 3 and 4. Accordingly electrodes 34, 35 and 36 are given positive charges of magnitudes most suitable for the dimensions of the tube. It has been found that electrodes 34 and 36 should be at the same potential as the target plates, this being particularly desirable as concerns electrode 36, because thereby the average acceleration undergone by an electron in moving between electrode 36 and the target plates is zero. The voltage between electrode 35 and the cathode may be considerably less, and since the shape of the apertures has a controlling effect on the area of the beam, they should be accurately circular.

To obtain the voltage relations just described electrode 34 is connected to junction point 255 through conductors 275, 276 and 257, electrode 36 is connected to junction point 255 through conductors 277, 276 and 257, and electrode 35 is connected to slider 77 of voltage divider 73 through conductor 280. Slider 77 is adjusted to give a beam diameter of about ⅜ of an inch at the target plate.

Condenser 86 is connected between slider 77 and conductor 263 to reduce the effect of transient variations in the power supply on the cross sectional area of the beam.

As pointed out above, means must be provided to bring the beam initially to the central position. For this purpose it is caused to pass between the pairs of deflecting plates. If the plates of a pair are at the same positive potential, they attract the beam equally and have only a slight defocusing effect: if they are not of the same potential the one which is more positive attracts the beam more than the other and the beam is deflected toward the more positive plate.

Deflecting plate 40 is connected to slider 97 by conductor 281, and deflecting plate 41 is connected to slider 95 by conductor 292. The left end of winding 96 and the right end of winding 94 are connected to positive terminal 63 by conductor 283, and are thus more positive than junction point 255. The right end of winding 96 and the left end of winding 94 are connected to junction point 284 by conductor 285, and are thus less positive than junction point 255. When the sliders are at the centers of their windings deflecting plates 40 and 41 are both at the polarity of junction point 255, and neither has any deflecting effect upon the beam. As the sliders are moved to the left, plate 40 becomes more positive and plate 41 less positive, and the beam is deflected in a direction parallel to axis 50, toward target plate 44 and away from target plate 45: if the sliders are displaced to the right the deflection of the beam is in the opposite direction.

Deflecting plate 42 is connected to slider 91 by conductor 286, and deflecting plate 43 is connected to slider 93 by conductor 287. The left end of winding 92 and the right end of winding 90 are connected to positive terminals 63 by conductor 283, and are thus more positive than junction point 255. The right end of winding 92 and the left end of winding 90 are connected to junction point 284 by conductor 285, and are thus less positive than junction point 255. When the sliders are at the centers of their windings, deflecting plates 42 and 43 are both at the potential of junction point 255, and the beam is not deflected. As the sliders are moved to the left, plate 43 becomes more positive and plate 42 less positive, and the beam is deflected in a direction parallel to axis 51, toward target plate 47 and away from target plate 46: if the sliders are displaced to the left, the deflection of the beam is in the opposite direction.

The sliders are adjusted during the setting up of the system so that with the tube vertical and axis 50 in the magnetic meridian, north being in the direction of the heading of the craft 56, the beam impinges on target plates 44 and 45 equally, and on target plate 47 more than on target plate 46, the center of the spot being deflected toward plate 47 by about ⅛ of an inch.

The conditions just set forth result in equal and opposite target currents in the halves of primary winding 101 of transformer 13, and accordingly no voltage from the secondary winding 100 is impressed by conductors 292 and 293 on electronic unit 15, and no output voltage appears between terminals 116 and 117 of the unit. The target current downward in primary winding 104 of transformer 12 is greater than that flowing upward, and a voltage is induced in secondary winding 103 of the transformer and impressed by conductors 290 and 291 on the input of electronic unit 14. This voltage alternates at the frequency of the source, by reason of the intensity modulation of the beam: the unidirectional component of the target current is not transmitted through the transformer.

Power terminals 112 and 113 of electronic unit 14, and power terminals 120 and 121 of electronic unit 15 are energized from terminals 61 and 62 through conductors 294 and 295. The unit 14 amplifies the input voltage without materially shifting its phase, and rectifies the amplified voltage by transmitting only the first or the second half cycles according as the input voltage is in phase (current in the upper half of winding 104 greater) or out of phase (current in the lower half of winding 104 greater) with that at terminals 61 and 62. There appears at output terminals 110 and 111, for the case when the craft is heading in the direction of magnetic north, a unidirectional, pulsating voltage of such a polarity that the terminal 110 is positive: this "cosine" voltage is impressed across resistors 124 and 125 by conductors 296 and 297. The common junction point 126 of resistors 124 and 125 is grounded by conductors 301 and 302 and ground connection 188. Condensers 127 and 130, connected between junction point 126 and conductors 296 and 297 respectively, and condenser 131, connected between conductors 296 and 297, are effective to filter out the alternating components of the cosine voltage so that the voltage between conductors 296 and 297 is essentially a pure unidirectional voltage which varies as the beam moves between target plates 46 and 47.

The cosine voltage is impressed upon recentering coil 16 by conductors 303 and 304 in such a polarity as to create a magnetic flux in the direction of the heading of the craft. This deflects the beam cross-wise of the craft, from plate 47 toward plate 46, and accordingly reduces the signal to electronic unit 14 and therefore the output from the unit. The gain in amplifier 14 and the number of turns in coil 16 are so chosen that when a condition of equilibrium between the earth's field and that of coil 16 is reached, the beam is displaced from its central position toward target plate 47 by about 1/80 of an inch.

Output terminals 116 and 117 of electronic unit 15 are connected across resistors 132 and 133 by conductors 305 and 306. The common junction point 307 of resistors 132 and 133 is grounded through conductors 310 and 302 and ground connection 188. Filtering condensers 135 and 136 are connected between conductors 306 and 305, respectively and junction point 307, and condenser 137 is connected between conductors 305 and 306 in a structure in every way similar to that described above, to give essentially pure unidirectional "sine" voltage between conductors 306 and 305: in the condition of the system described above, the sine voltage is zero, corresponding to an angle $\theta$ of zero degrees. Recentering coil 17 is connected across resistors 132 and 133 by conductor 311 and conductors 305 and 312: since there is no sine voltage no current can flow in the recentering coil and the beam is unaffected.

The cosine voltage is impressed on ratio meter 20 by conductors 313 and 314, and the sine voltage is impressed on ratio meter 20 by conductors 311 and 315 and conductors 305, 312 and 316, and the needle of the meter takes the position corresponding to the tangent of $\theta$; $\theta$ in this case equals zero. If it is desired to compare the heading of the craft at any time with the magnetic north, the zero of the ratio meter is brought to alignment with the needle at this point.

Resolver 23 is set by manual adjustment of shaft 151 so that its angle $\phi$ is as nearly zero as possible. The cosine voltage is applied to terminals 143 and 144 of resolver 23 by conductors 303 and 317 and conductors 304 and 320. The sine voltage is applied to terminals 145 and 146 of the resolver by conductors 306 and 321 and conductors 305 and 322. If the setting to zero of the angle $\phi$ of resolver 23 has been exact, no voltage appears at output terminals 147 and 150 of the resolver (as will be indicated by lack of operation of motor 200). If the setting is incorrect, terminals 147 and 150 are not at the same potential, and the same voltage difference is conducted to fixed contacts 172 and 173 of interrupter 27 by conductors 323 and 324.

Movable contact 171 of interrupter 27 is connected to ground through blocking condenser 183, winding 184 of potential divider 185, conductor 325 and ground connection 188. It is maintained in motion at the frequency of the A. C. supply by voltage led from terminals 61 and 62 by conductors 326 and 330 and conductors 327 and 331 to the primary 176 of transformer 175, and from the secondary 174 of the transformer by conductor 332, phasing condenser 329 and conductor 333 to winding 170 of the interrupter. A portion of the fundamental alternating component of the square wave voltage resulting on movable contacts 171 is impressed on the input of amplifier 25 by slider 186 and conductor 338. The amplifier is also supplied with alternating voltage from the source by conductors 326 and 334 and conductors 327 and 335.

If the input voltage and the power voltage are of the same phase, motor 200 is energized through conductors 336, 337 and 340, to operate in a forward direction, and if the input voltage is of the opposite phase the motor is energized to operate in the reverse direction. Operation of the motor is an indication that resolver 23 is not correctly adjusted, and shaft 151 is manually rotated until the operation of motor 200 stops. The resolver is now set accurately to an angle φ of zero: index 202 may be set to indicate north on scale 203 and motor 200 may be coupled to shafts 151 and 201.

Resolver 24 is set by manual adjustment of shaft 212 so that angle φ is as nearly zero as possible. The cosine voltage is applied to terminals 204 and 205 of resolver 24 by conductors 303, 317 and 341 and conductors 304, 320 and 342. The sine voltage is applied to terminals 206, 207 of the resolver by conductors 321 and 343 and conductors 322 and 344. If the setting to zero of the angle φ of resolver 24 has been exact, no voltage will appear at output terminals 210 and 211 of the resolver as will be indicated by lack of energization of torque motor 232. If the setting is incorrect, terminals 210 and 211 are not at the same potential, and the voltage difference is conducted to fixed contacts 213 and 214 of interrupter 28 by conductors 345 and 346.

Movable contact 215 of interrupter 28 is connected to ground through blocking condenser 217, winding 220 of potential divider 221, conductor 347 and ground connection 188. It is maintained in motion at the frequency of the A. C. supply by voltage led from terminals 61 and 62 through conductors 326 and 330 and conductors 327 and 331 to the primary 176 of transformer 175, and from the secondary 174 of the transformer by conductors 332 and 333 and phasing capacitor 349 to winding 216. A portion of the fundamental alternating component of the square wave voltage resulting on movable contact 215 is impressed on the input of amplifier 26 by slider 222 and conductor 350. The amplifier is also supplied with alternating voltage from the source by conductors 326 and 352 and conductors 327 and 351.

If the input voltage and the power voltage are of the same phase, torque motor 232 is energized through conductors 353, 354 and 355 to operate in a forward direction, and if the input voltage is of the opposite phase the motor is energized to operate in the reverse direction. Operation of the motor is an indication that resolver 24 is not correctly adjusted, and shaft 212 is manually rotated until operation of motor 232 stops. The resolver is now set accurately to an angle φ of zero: gyroscope 22 may be coupled to shaft 212 and energized, and index 241 may be set to indicate north on scale 240.

*Operation*

Having been set up and adjusted as indicated above, the operation of the system is as follows. So long as the heading of the craft lies in the magnetic meridian, no change in the direction of the beam with respect to the target plates takes place. Accordingly there is no change in the sine and cosine voltages, the indication of ratio meter remains unaltered, and motor 200 remains unenergized so that the indication of indicator 21 does not change. Torque motor 232 also remains unenergized as long as the gyroscope does not drift with respect to the craft: it will be realized that so long as the heading of the craft remains the same, any movement of the gyroscope with respect thereto is due to drift of the gyroscope, and results in rotation of shaft 212 of resolver 24. When such rotation takes place, angle φ is no longer equal to angle θ and fixed contacts 213 and 214 assume different potentials with respect to ground. This results in the appearance of an alternating voltage on the input of phase sensitive amplifier 26, which results in energization of torque motor 232 in such a sense as to precess gyroscope 22 back into its original alignment. This actuates shaft 212 to adjust angle φ until it is again equal to angle θ, when energization of the torque motor ceases.

If the heading of the craft changes, two effects occur simultaneously. The first of these effects is a change in the position of the beam with respect to the target plates: the second effect is a movement of the resistance members of resolver 24 with respect to the gyro stabilized shaft 212. The sine and cosine voltages are now functions of a new angle θ' and ratio meter 20 indicates this new angle. The angular position of the sliders of resolver 24 has a new value φ'. Since both the compass and the resolver are mounted in the craft and move unitarily through the same angle, θ' is equal to φ', and if the torque motor system was in balance before the heading of the craft changed, it will remain in balance throughout the change in heading.

So far as the relationship between the compass and the directional gyroscope is concerned, it may be briefly expressed as follows. The two instruments are mounted for unitary azimuth displacement, and the compass has no tendency to permanent drift away from the magnetic meridian, while the gyroscope does have a tendency to drift away from its original heading. After the instruments are brought into original coordination, no sustained signal from the compass is applied to the torque motor of the gyroscope so long as the two instruments remain in the coordinated relationship. The only thing which can disturb this coordinated relationship is drift of the gyroscope from its original position, and when this takes place its new relationship with respect to the compass results in a resolver output voltage which energizes torque motor to bring the gyroscope back into coordinated relationship.

If desired the output of amplifier 26 may be applied directly to a rudder servomotor instead of being used to precess the directional gyroscope, but this is not the preferred mode of practicing the invention.

Turning of the craft does not cause any relative movement between the windings of resolver 23 and its sliders, so fixed contacts 172 and 173 assume different potentials with respect to ground. This results in the appearance of an alternating voltage in the input of amplifier 25, which results in energization of motor 200 in such a sense as to move the sliders toward a new position in which angle φ' is equal to angle θ'. When this condition has been reached, the motor is deenergized, and index 202 has been driven to a new position with respect to scale 203 which indicates the new heading of the craft.

In the embodiment of the invention shown in Figure 1, the following values of components were found satisfactory.

```
Resistors:
    71, 72, 124, 125, 132, 133 ------- 5,000 ohms.
    73 ------------------------------- 40,000 ohms.
    74 ------------------------------- 10,000 ohms.
    90, 92, 94, 96 ------------------- 2 megohms.
    180, 220 ------------------------- 1 megohm.
Condensers:
    85, 86, 183, 217 ----------------- .05 microfarad.
    127, 130, 135, 136 --------------- 8 microfarads.
    131, 137 ------------------------- .25 microfarad.
    329 ------------------------------ 1.25 microfarads.
Voltage of secondary 67 -------------- 6.3 volts.
Voltage of secondary 70 -------------- 25 volts.
Voltage between 63 and 64 ------------ 400 v. D. C.
Voltage between 61 and 62 ------------ 115 v. 400 cycles 1
                                       phase A. C.
```

*Structure of the modification of the invention*

Figure 2 illustrates a simplified modification of the invention in which many of the components, particularly those relating to the recentering of the beam, have been omitted, together with their functions. For purposes of illustration the showing of the ratio meter and the motor indicator has not been repeated in this figure, the directional gyroscope only being shown.

The system of Figure 2 comprises a cathode ray tube 410, a power supply 411 for the tube, a pair of transformers 412 and 413 coupling the output of the tube to a resolver 414, and a transformer 415, coupling the resolver to a phase sensitive amplifier 416, which energizes the torque motor of directional gyroscope 417.

Cathode ray tube 410 is shown to comprise the usual envelope 420 enclosing an electron gun comprising a heater filament 421, a cathode 422, a control electrode 423 referred to as a grid because of its function rather than because of its structure, and a plurality of focusing and accelerating electrodes 424, 425, 426 and 427. The tube also includes a plurality of deflecting plates 430, 431, 432 and 433 and a plurality of target plates 434, 435, 436 and 437, and is coated on its inner surface with a conducting layer 440. The tube is pendulously mounted in an inner support ring 441 connected by diametrically opposite pivot pins 442 with an external ring 443: the latter ring is mounted, on diametrical pivot pins extending at right angles to pins 442, in any suitable support member, not shown. It is to be noted that in tube 410, the electron beam proceeds downwardly, while in tube 10 the beam proceeded upwardly. It is also to be noted that in connection with tube 410 there are no recentering coils.

Power supply 411 is shown to comprise a transformer 444 having a primary winding 445 and a pair of secondary windings 446 and 447. The transformer is designed for energization with an alternating voltage applied to input terminals 61 and 62. A second pair of input terminals 452 and 453 is arranged for energization from any suitable source of unidirectional voltage, the polarity being such that terminal 453 is positive and terminal 452 is negative. Power supply 411 also includes fixed resistors 454 and 455 and the windings 457 and 460 of a pair of voltage dividers 461 and 462 having sliders 463 and 464 respectively.

In a copending application, Serial No. 771,265, filed August 29, 1947, now Patent No. 2,505,261, granted April 25, 1950, in the name of Richard Syrdal, and assigned to the assignee of the present application, there is a complete disclosure of details of the structure of the cathode ray tube indicated at 410 in Figure 2. For details of the structure, energization, and function of this tube per se, reference is made to that application.

Transformer 412 comprises a primary winding 654, having center tap 655, and a secondary winding 656. Similarly, transformer 413 comprises a primary winding 657, having a center tap 660, and a secondary winding 661. If an A. C. ratio meter or differential voltmeter were to be used with this modification of the invention, it would be connected to secondary windings 656 and 661.

Although the resolver shown in Figure 6 functions satisfactorily in the modification of the invention shown in Figure 2, I prefer to use a modified resolver shown in detail in Figure 7. The modified resolver is shown to comprise a pair of resistance units 662 and 663 comprising respectively resistance members 664 and 665 and sliding contacts 666 and 667 operated by a common shaft 470. As best shown in Figure 7, resistance member 664 comprises a substantially flat form 471 around which there is a winding 472 having a center tap 473. Similarly resistance member 665 comprises a winding 474 with a center tap 475 wound on a form 476 of insulating material. Windings 472 and 474 are of extremely fine wire, and are put on the forms with a uniform advance. If desired all forms may be slightly convex to aid in maintaining the windings tight and uniform.

Electrical connection is made to the ends of winding 472 by conductors 477 and 480, and to the ends of windings 474 by conductors 481 and 482. Sliders 666 and 667 are mutually insulated, and electrical connection is made thereto by conductors 483 and 484, respectively. Center taps 473 and 475 are electrically interconnected by conductor 485.

Transformer 415 is shown in Figure 2 to comprise a primary winding 486 and a secondary winding 487, and functions to couple conductors 483 and 484 of resolver 414 to the input terminals 490 and 491 of amplifier 416.

Amplifier 416 further comprises a pair of power terminals 492 and 493, and output terminals 494, 495 and 496. The amplifier is of the same nature as amplifiers 25 and 26 of Figure 1, and its output energizes the torque motor of directional gyroscope 417, which also is of the same nature as that of directional gyroscope 22 of Figure 1: the torque motor of directional gyroscope 417 is not specifically shown, but it will be realized that an arrangement such as was previously described is included in gyroscope 417.

The gyroscope is arranged for connection to shaft 470 of resolver 414 so that the position of sliders 666 and 667 is controlled thereby. The gyroscope also stabilizes another shaft 497 which may be unitary with or distinct from shaft 470, and which actuates a slider 500 with respect to a winding 501 to comprise a voltage divider 502 forming for example a part of the automatic pilot of the craft to which the compass system is mounted. Winding 501 is mounted for pivotal movement about the axis of shaft 497, the mount being provided with adjusting means such as gear teeth 503 engaging a pinion 504 actuated by a manual knob 505. The mount also carries an index 506 for adjustment with respect to a fixed scale of azimuth 507.

Circuit connections of the modification

Since much of the explanatory matter given in describing the connections between power supply 11 and cathode ray tube 10 of Figure 1 applies equally well to the connections between power supply 411 and cathode ray 410, this matter will not be repeated. Primary winding 445 of transformer 444 is energized from terminals 61 and 62 through conductors 510 and 511. Heater filament 421 of the cathode ray tube is energized from secondary winding 446 of transformer 444 through conductors 512, 513 and 514, and cathode 422 is connected to one side of heater filament 421 by conductors 513, 515 and 518. A voltage alternating about a central negative value is applied between cathode 422 and grid 423 of cathode ray tube 410 through a circuit which includes conductors 514, 515 and 516, junction point 517, resistor 454, junction point 520, secondary winding 447 and conductor 521, in such fashion that grid 423 never becomes positive with respect to cathode 422. A suitable unidirectional voltage drop is maintained in resistor 454 by connection of the resistor in a series circuit which may be traced from terminal 453 through conductor 522, junction point 523, winding 460, junction point 524, winding 457, junction point 526, resistor 455, junction point 517, resistor 454, junction point 520, and conductor 527 to terminal 452. From this it will be seen that junction point 520 is negative with respect to junction point 517, with respect to which all the other junction points are positive.

Electrodes 424 and 426 are maintained at the highest positive potential, that of junction point 523, by means of conductors 530, 531 and 532. Electrode 425 is maintained at a much less positive potential with respect to cathode 422 by a conductor 533 which connects it with junction point 526. Electrode 427 is maintained at a potential slightly less than maximum positive potential by a conductor 534 which connects it with junction point 524. Deflecting plates 430 and 432 and conducting layer 440 are maintained at the same potential as anode 427 by connection thereto internal of the tube indicated by reference numerals 535, 536, 537 and 538. The potential of deflecting plate 431 is maintained adjustably equal to or greater than that of deflecting plate 430 by a conductor 540 which connects it to the slider 464 of voltage divider 462. The potential of deflecting plate 433 is maintained equal to or less than the potential of deflecting plate 432 by an electrical conductor 541 which connects it to slider 463 of voltage divider 461. It will be understood that in the construction of the tube the electrodes are so arranged that if there is any tendency for the beam to be off center, this will take place in the direction of plates 433 and 430, so that the adjustment available by sliders 463 and 464 will be in the proper sense to center the beam.

As in the tube of Figure 1 four target current circuits may be traced. The first of these circuits may be traced from positive junction point 523 through conductors 542 and 543, center tap 655, the upper portion of winding 654, conductor 544, target plate 434, the electron beam 419, cathode 422, conductors 518 and 516, junction point 517, and resistor 454, to negative junction point 520. The second circuit follows the same path, except that between center tap 655 and electron beam 419 it traverses the lower portion of winding 654, conductor 545 and target plate 435. The opposition of target currents and therefore of induced fluxes in the core of transformer 412 is obviously the same as that discussed in Figure 10.

Similarly, a third target current circuit may be traced from positive junction point 523 through conductors 542 and 546, center tap 660, the upper portion of winding 657, conductor 547, target plate 437, electron beam 419, cathode 422, conductors 518 and 516, junction point 517, and resistor 454 to negative junction point 520. The fourth target current circuit follows the same path, except between center tap 660 and electron beam 419 it traverses the lower portion of winding 657, conductor 550 and target plate 436. Here again the opposition of target currents and resultant fluxes in transformer 413 is the same as that described in Figure 1.

Input conductors 477 and 480 of resolver 414 are connected to secondary winding 656 of transformer 412, and input conductors 481 and 482 of resolver 414 are connected to secondary winding 661 of transformer 413, respectively. Output conductors 483 and 484 of resolver 414 are connected to primary 486 of transformer 415, and secondary winding 487 is connected to input terminals 490 and 491 of amplifier 416 by conductors 551 and 558. Power terminals 492 and 493 of amplifier 416 are energized from terminals 61 and 62 through conductors 552 and 553, and the torque motor of directional gyro 417 is energized from terminals 494, 495 and 496 of amplifier 416 through conductors 556, 555, and 554. Conductors 557, 560 and 561 lead from voltage divider 502 to the automatic pilot circuit.

In setting up the modified system, tube 410 is mounted in the aircraft so that the line of action of deflecting plates 430 and 431 is across, and that of plates 432 and 433 is along the longitudinal axes of the craft, which is oriented so that its heading is in the magnetic meridian. Shaft 497 is disconnected from gyroscope 417, slider 500 is set at the center of winding 501, index 506 is set at north on scale 507, and the azimuth function of the automatic pilot is set for straight flight.

Since the electron beam is directed downwardly instead of upwardly, the earth's magnetic field this time deflects it to the left in the figure rather than to the right, that is, to the west rather than to the east, so that target plates 436 and 437 are equally impinged, while target plate 434 is impinged to a greater extent than target plate 435. Equal and opposite primary currents flow in transformer 413 and accordingly no output voltage appears across secondary winding 661 of the transformer. On the other hand the target current in the upper portion of primary winding of transformer 412 exceeds that in the lower portion of the winding, and an output voltage appears in secondary winding 656 and is impressed upon the winding 664 of resistance unit 662. One of the differences between the modification of Figure 2 and the modification of Figure 1 is now quite evident, in that the voltages on the resolver resistance members in Figure 2 are of alternating character, while those in Figure 1 were of unidirectional character. The amplitude of the output voltage of transformer 412 is nevertheless proportional to the cosine of the angle $\theta$, and that of transformer 413 is proportional to the sine of angle $\theta$.

Referring now to Figure 7, it will be apparent that any rotation of shaft 470 causes movement of slider 666 with respect to winding 664. The component of this movement perpendicular to the direction of the wires of the winding causes a marked change in the resistance between the slider and center tap 473, since it includes more and more turns of the resistance wire. Contrariwise, the component of the movement of slider 666 parallel to the direction of the wire has little effect on the resistance between sliders 666 and tap 473, which at most can be changed in resistance only by that of less than half a turn of the wire as compared with a maximum resistance change equal to several hundred turns in the other direction. It may therefore be said with sufficient accuracy for the purpose of the present invention that the resistance between slider 666 and center tap 473 varies with a first component of the movement of the slider, which in turn is proportional to the sine of angle $\phi$. In the same manner the resistance between center tap 475 and slider 667 is proportional to a second component of the movement of the slider at right angles to the first component, that is, the sine of $(90+\phi)$ or to the cosine of $\phi$.

The applied voltage between conductors 477 and 480 is proportional to cosine $\theta$ and the voltage between the center tap 473 and slider 666 is therefore $$\frac{\cos \theta}{2} (\sin \phi)$$

The applied voltage between conductors 481 and 482 is proportional to sine $\theta$, and the voltage between center tap 475 and slider 667 is therefore $$\frac{\sin \theta}{2} (\cos \phi)$$

The voltage difference between sliders 666 and 667 is $$\frac{\cos \theta}{2} (\sin \phi) - \frac{\sin \theta}{2} (\cos \phi)$$

When $\phi$ equals $\theta$, the two terms are equal and the voltage difference becomes zero: resolver 414 accordingly functions in a fashion similar to resolvers 23 and 24 in Figure 1 to give an output voltage which is zero when angle $\phi$ of the resolver is equal to the angle $\theta$ of beam deflection: the output voltage is alternating and reverses in phase as $\phi$ is greater or less than $\theta$, just as the unidirectional voltage output of the resolver in Figure 1 reverses in polarity according as $\phi$ is greater or less than $\theta$.

Amplifier 416 in Figure 2 functions to energize output terminals 494, 495 and 496 in a first or a second fashion, according as the voltage supplied by transformer 415 is in phase or out of phase with the voltage supplied to power terminals 492 and 493, and the torque motor of directional gyroscope 417 is energized in a forward and a reverse direction accordingly, precessing the gyroscope to adjust angle $\phi$ by operation of shaft 470, and to control the automatic pilot by rotation of slider 500 with respect to winding 501.

In the original installation of the system angle $\phi$ is set as close to zero as can be. As before, operation of the torque motor of the gyroscope is an indication that the setting is not exact, and it is adjusted until operation of the torque motor stops, after which shaft 497 may be coupled to the gyroscope.

*Operation*

The operation of the modification of the invention is the same as that of the modification previously described. As long as the gyroscope does not drift in azimuth, no signal voltage is transmitted to the torque motor: change in the heading of the craft changes angle $\phi$ and angle $\theta$ by the same amount, and no energization of the torque motor results. If the gyroscope does drift, sliders 466 and 467 are moved, angle $\phi$ is no longer equal to angle $\theta$, and a voltage is supplied to amplifier 416 of such a phase as to cause energization of the torque motor in a sense to precess the gyroscope back into alignment with the magnetic meridian, and to correct any erroneous signal being supplied to the automatic pilot due to voltage stabilization of slider 500.

It will be evident that each of resistance units 153, 154, 662, and 663 functions in the apparatus as though it were an anisotropic resistance element, that is, an element whose resistivity is not the same in all directions.

In the foregoing specification there are disclosed improved means for preventing the loss of azimuth in a directional gyroscope by slaving it in a novel fashion to a cathode ray compass, as well as means for obtaining a remote indication of magnetic heading from such a compass. The means are shown to comprise a novel angle repeating system and also to comprise means for minimizing the effects on the controlled unit of defects in the field sensing unit. As a subordinate inventive contribution there are disclosed details of two particular variable resistance units, and the application of the system to the control of the craft in azimuth is also clearly described.

It should be pointed out that the field sensing system disclosed herein is not limited to compass applications, but may be used wherever indication or control in response to a magnetic field is desired: geophysical prospecting is an example of another field to which the invention is applicable.

Numerous objects and advantages of my invention have been set forth in the foregoing description, together with details of the structure and function of the invention, and the novel features thereof have been clearly described. The disclosure, however, is illustrative only, and I may make changes in detail, especially in matters of shape, size and arrangement of parts, within the principle of the invention, to the full extent indicated by the broad general meaning of the terms in which the appended claims are expressed.

I claim as my invention:

1. A compass system comprising in combination: a cathode ray tube having an electron gun, emitting a vertical beam of electrons deflectable by a magnetic field, and sector shaped target plates mounted in symmetrical pairs for variable relative impingement by said beam to give variable target currents; means connected to each pair of oppositely disposed plates to derive from the difference between the target currents therethrough a voltage determined thereby, said voltages being proportional to the components of said magnetic field along the pair of axes about which said pairs of plates are respectively symmetrical; a resolver comprising a pair of voltage dividers, each including a resistance unit and a slider making movable contact therewith, and means mounting said units and said sliders for simultaneous relative movement so that the output from each voltage divider is a function of said movement; means impressing said voltages upon said resistance units; motor means connected to said sliders for causing said movement; voltage responsive means energizing said motor means when said sliders are not at the same potential; and heading indicating means actuated by operation of said motor.

2. In combination: a cathode ray tube having an electron gun, directing along an axis a deflectable beam of electrons modulated in intensity, and quadrantal target plates mounted about said axis in opposed pairs symmetrical about horizontal axes for variable impingement by said beam to give variable target currents; means pendulously mounting said tube for deflection of said beam by the earth's magnetic field; means connected to each pair of said plates for deriving from the difference between the target currents thereof an alternating voltage determined in phase and amplitude by said difference; an amplifier and phase sensitive rectifier deriving from each said alternating voltage a unidirectional voltage the polarity and magnitude of which are determined by the phase and amplitude of said alternating voltage; a controlled member actuated in accordance with said unidirectional voltages; means for electrically deflecting said beam in the direction of each said horizontal axis; and means applying said unidirectional voltages to said last named means in a degenerative feedback system to almost completely oppose deflection of said beam by the earth's magnetic field, thus limiting the actual movement of the beam and hence minimizing inaccuracies in the actuation of the controlled member due to non-circularity of said beam and non-equality of said amplifiers and of said rectifiers.

3. In combination: a first resistance unit; means applying across said unit a first voltage proportional to the cosine of a selected angle; a first slider rotatable with respect to said first unit so that the potential of said slider with respect to a reference point varies with a first component of the movement of said slider and is relatively unaffected by a second component of said movement; a second resistance unit; means applying across said unit a second voltage proportional to the sine of said selected angle; a second slider rotatable with respect to said second unit so that the potential of said slider with respect to said reference point is relatively unaffected by a first component of the movement of said second slider and varies with a second component of said movement; means mounting said units so that said first components have the same direction and said second components are directed perpendicular thereto; and means causing simultaneous movement of said sliders from a normal position in passing through which said first slider is subject to maximum rate of change of potential and said second slider is subject to minimum rate of change of potential, whereby said sliders assume the same potential when rotated from said normal position by said selected angle.

4. In combination: a pair of resistance units each of which comprises a pair of rectilinear resistance members of equal length, means insulatingly mounting said members to form the opposite sides of a square, a pair of electrically conducting members completing said square and each connected to one end of each of said resistance members, and a single slider pivoted at the center of said square for making electrical connection with said members at any single spot along the periphery of said square; means mounting said units so that the resistance members of each are parallel to the conducting members of the other; means insulatingly connecting said sliders in aligned relationship for unitary rotation from a normal position in which one slider is at the center of one of said resistance members and the other slider is at the center of one of said conducting members; means making electrical connection to said conducting members and said sliders; and means for causing rotation of said slider.

5. In combination: a pair of resistance units each of which comprises a resistance winding having at least one substantially plane surface of rectangular outline, a slider pivoted about an axis substantially perpendicular to the center of said surface, and making contact therewith along a circle whose diameter is not greater than the shortest dimension of said rectangular surface, so that at two points along said circle said slider is moving perpendicular to the wires of said winding and at points 90 degrees later along said circle, said slider is moving parallel to the wires of said winding; means short circuiting those of the wires of said winding extending from said last named points to the adjacent ends of said winding, and tap means making electrical connection to said winding midway between said last named points; means insulatingly mounting said units so that said planes are substantially parallel; means insulatingly connecting said sliders for unitary rotation, from a normal position in which one of said sliders is at one of said first named points and the other slider is at one of said last named points; means electrically connecting said tap means; means energizing said windings with voltages whose magnitudes are sine and cosine functions of a variable; and voltage responsive means connected between said sliders for simultaneously causing rotation of said sliders, whereby to reduce the voltages therebetween to zero.

6. A compass system comprising, in combination: a cathode ray tube having an electron gun, directing along a vertical axis a beam of electrons deflectable by the earth's magnetic field, and sector shaped target plates, mounted in symmetrical pairs for variable impingement by said beam to give variable target currents; means for electrically deflecting said beam independently of said field; means connected to each pair of oppositely disposed plates to derive from the difference between the target currents thereof a voltage determined thereby, said voltages being proportional to the components of the earth's magnetic field along the pair of axes about which said pairs of plates are respectively symmetrical; a resolver comprising a pair of resistance units, a pair of sliders making movable contact therewith and means mounting said units and said sliders for simultaneous relative movement; means impressing said voltages upon said resistance units, motor means for causing said movement when said sliders are not at the same potential, and controlled means actuated by operation of said motor and coordinated with the alignment of said field with one of said axes; and degenerative feedback means, including said beam deflecting means, whereby said voltages are effective to reduce the actual deflection of said beam in response to said field, so as to minimize the effect on said controlled member of non-uniformity of said beam and non-equivalence in said voltage deriving means.

7. A compass system comprising, in combination: a cathode ray tube having an intensity modulated beam of electrons deflectable by the earth's magnetic field and target plates impinged by said beam in accordance with the deflected position thereof, so as to give a pair of alternating voltages varying in amplitude and phase with the magnitude and polarity of the components of the earth's magnetic field along a pair of horizontal mutually perpendicular axes; an amplifier and phase sensitive rectifier deriving from each alternating voltage a unidirectional voltage determined in polarity and magnitude by the phase and amplitude of said alternating voltages; means utilizing said voltages to partially return said beam from its deflected position; a resolver comprising a pair of resistance units, a pair of sliders making movable contact therewith, means impressing said voltages upon said resistance units, and means mounting said sliders for simultaneous movement relative to said units, to cause a unidirectional voltage to appear between said sliders; means converting said unidirectional voltage to alternating voltage of a phase and amplitude determined by the polarity and magnitude of said unidirectional voltages; motor means for reversibly causing said movement of said sliders in accordance with the phase of said last named alternating voltage, to move said sliders to a position in which they are at the same potential; and controlled means actuated by said motor means.

8. A device of the class described comprising, in combination, a reversible motor, an electronic amplifier energizing said motor in accordance with the sense of a signal voltage, electron discharge means including at least three target electrodes through which the discharge thereof takes place to comprise target currents, which vary in interdependent relationship with condition responsive variation in said discharge, and variable means combining the effects of said currents to give a single sense reversing signal voltage, and applying said voltage to said amplifier.

9. In combination: means giving signal voltages proportional to the components of a magnetic field along a pair of horizontal intersecting axes, including means subject to angular displacement in response to said field; and a resolver, including a member to be controlled in accordance with said angular displacement, a first resistance unit whose resistivity along a first axis is negligible in comparison with its resistivity along an axis normal to said first axis, means applying one of said signal voltages across said unit, a first slider movably engaging said first unit so that the potential of said slider with respect to a first reference point on said unit varies with the component of the movement of said slider parallel to said second axis and is relatively unaffected by the component of said movement parallel to said first axis, a second resistance unit whose resistivity along a first axis is negligible in comparison with its resistivity along an axis normal to said first axis, means applying the other of said signal voltages across said second unit, a second slider movably engaging said second unit, so that the potential of said second slider with respect to a second reference point on said second unit varies with the component of the movement of said second slider parallel to said second axis and is relatively unaffected by the component of said movement parallel to said first axis, and means responsive to differences between the potentials of said sliders for causing movement of said member to be controlled and also causing simultaneous movement of said sliders from a normal position in passing through which said first slider is subject to maximum rate of change of potential and said second slider is subject to minimum rate of change of potential.

10. In a device of the class described, in combination: a resistance unit comprising a pair of rectilinear resistance members of equal length; means insulatingly mounting said members to form two opposite sides of a square, a pair of electrically conducting members of effectively zero resistance completing said square and each connected to one end of each of said resistance members, and a single slider pivoted at the center of said square for making electrical connection with said members at any single spot along the periphery of said square.

11. Apparatus of the class described comprising, in combination: a reversible motor; an electronic amplifier energizing said motor in accordance with the sense of a signal voltage; a rebalanceable motor control system connected to said amplifier, said system including a cathode ray tube having two pairs of target electrodes symmetrically disposed with respect to each other about an axis of said tube and means directing a beam of electrons along said axis for impingement on said electrodes to comprise target currents, means mounting said tube with its axis vertical so that the effect of the earth's magnetic field is to cause the beam to be deflected from a normally vertical position in which said target currents are equal, means for combining said target currents to produce a single signal voltage whose sense is dependent upon the deflection of said beam from said vertical position, and means for rebalancing said system to reduce said signal voltage to zero; means driven by said motor to position said rebalancing means; and controlling means driven by operation of said motor.

12. Apparatus of the class described comprising, in combination: a reversible motor; an electronic amplifier energizing said motor in accordance with the sense of a signal voltage; a rebalanceable motor control system connected to said amplifier, said system including a cathode ray tube having two pairs of target electrodes symmetrically disposed with respect to each other about an axis of said tube and means directing a beam of electrons along said axis for impingement on said electrodes to comprise target currents, means mounting said tube with its axis vertical so that the effect of the earth's magnetic field is to cause the beam to be deflected from a normally vertical position in which said target currents are equal, potentiometric means for combining said target currents to produce a single signal voltage whose sense is dependent upon the deflection of said beam from said vertical position, and means for adjusting said potentiometric means to rebalance said system so as to reduce said signal voltage to zero; means connecting said motor in driving relation to said adjusting means; and controlling means driven by operation of said motor.

13. Apparatus of the class described comprising, in combination: a reversible motor; an electronic amplifier energizing said motor in accordance with the sense of a signal voltage; a rebalanceable motor control system connected to said amplifier, said motor control system including a cathode ray tube having two pairs of target electrodes disposed at right angles with respect to each other and means directing a beam of electrons axially of said tube for impingement on said electrodes to comprise target currents, means mounting said tube with its axis vertical so that the effect of the earth's magnetic field is to cause the beam to be deflected from a normal vertical position in which said target currents are equal, means for combining said target currents to produce a pair of voltages varying in accordance with the components of the earth's magnetic field along a pair of mutually perpendicular horizontal axes, means combining portions of said voltages to comprise a single signal voltage for said amplifier, and means for rebalancing said system to reduce said signal voltage to zero; means driven by said motor to position said rebalancing means; and controlling means driven by operation of said motor.

14. In a telemetering system, a pair of potentiometers each comprising two spaced conducting members, diametrically opposed resistance paths between said members and equal in extent therewith, and a rotatable contact arm to engage said members and said resistance paths respectively throughout successive sectors of its rotary movement, the contact arm associated with each potentiometer being mechanically coupled to the other contact arm and electrically coupled to an indicator, the angular positions of the points of engagement of said contact arms relative to their respective conducting members and resistance paths differing by a fixed predetermined angle, means for establishing a predetermined difference of potential between said members, and means responsive to the variable potential difference between each contact arm and a given reference potential for furnishing a signal according to said variable potential differences.

15. In combination: means subject to unlimited angular displacement from a predetermined orientation; means giving voltage outputs proportional to the sine and cosine respectively of the angle of any such displacement; an indicator of angular displacement continuously adjustable from an indication of zero displacement; trigonometrically characterized, endless voltage dividers connected for adjustment concurrently with said indicator so that the ratios of output to input from said voltage dividers are proportional to the cosine and sine respectively of the angular displacement indicated by said indicator; means supplying said voltage outputs to the inputs of said voltage dividers; and means combining the outputs of said dividers to give a control signal which becomes zero when the angular displacement indicated by said indicator is equal to that of said first named means.

16. In combination: means subject to unlimited angular displacement from a predetermined orientation; means giving voltage outputs proportional to the sine and cosine respectively of the angle of any such displacement; an indicator of angular displacement continuously adjustable from an indication of zero displacement; trigonometrically characterized, endless voltage dividers connected for adjustment concurrently with said indicator so that the ratios of output to input from said voltage dividers are proportional to the cosine and sine respectively of the angular displacement indicated by said indicator; means supplying said voltage outputs to the inputs of said voltage dividers; means combining the outputs of said dividers to give a control signal which becomes zero when the angular displacement indicated by said indicator is equal to that of said first named means; motor means for adjusting said indicator; and means causing operation of said motor means in accordance with said control signal, so that said indicator continuously indicates the angular position of said first named means.

17. In combination: a pair of resistance units each of which comprises a resistance winding having at least one substantially plane surface of non-circular outline, a slider pivoted about an axis substantially perpendicular to the center of said surface, and making contact therewith along a circle whose diameter is not greater than the shortest dimension of said surface, so that at two points along said circle said slider is moving perpendicular to the wires of said winding and at points 90° later along said circle said slider is moving parallel to the wires of said winding, means short-circuiting those of the wires of said winding extending from said last named points to the adjacent ends of said winding, and tap means making electrical connection to said winding mid-way between said last named points; means insulatingly mounting said units so that said planes are substantially parallel; means insulatingly connecting said sliders for unitary rotation, from a normal position in which one of said sliders is at one of said first named points and the other slider is at one of said last named points; means electrically connecting said tap means; means energizing said windings with voltages whose magnitudes are sine and cosine functions of a variable; and voltage responsive means connected between said sliders.

WALDO H. KLIEVER.

References Cited in the file of this patent

UNITED STATES PATENTS

| Number | Name | Date |
|---|---|---|
| 2,025,580 | Engelhardt | Dec. 24, 1935 |
| 2,027,393 | McCreary | Jan. 14, 1936 |
| 2,158,500 | Guerra | May 16, 1939 |
| 2,220,055 | Fischel et al. | Oct. 29, 1940 |
| 2,261,309 | Stuart | Nov. 4, 1941 |
| 2,287,296 | Dallos | June 23, 1942 |
| 2,346,849 | Lear | Apr. 18, 1944 |
| 2,357,319 | Esval et al. | Sept. 5, 1944 |
| 2,357,922 | Ziebolz et al. | Sept. 12, 1944 |
| 2,361,433 | Stuart | Oct. 31, 1944 |
| 2,363,500 | Carter et al. | Nov. 28, 1944 |
| 2,392,370 | Esval et al. | Jan. 8, 1946 |
| 2,396,244 | Borsum | Mar. 12, 1946 |
| 2,404,387 | Lovell et al. | July 23, 1946 |
| 2,406,016 | Heising | Aug. 20, 1946 |
| 2,428,747 | Ziebolz | Oct. 7, 1947 |
| 2,434,057 | Sproule | Jan. 6, 1948 |
| 2,441,269 | Hartig | May 11, 1948 |
| 2,452,042 | Everett et al. | Oct. 26, 1948 |
| 2,454,184 | Kliever | Nov. 16, 1948 |
| 2,483,125 | Cummerow et al. | Sept. 27, 1949 |
| 2,491,725 | Glass | Dec. 20, 1949 |
| 2,502,786 | Hayslett | Apr. 4, 1950 |

FOREIGN PATENTS

| Number | Country | Date |
|---|---|---|
| 578,784 | Great Britain | July 11, 1946 |

OTHER REFERENCES

Kliever & Syrdal, "Cathode-Ray Compass," Product Engineering, August 1947, pp. 132-134. (Copy Div. 66.)

Kliever & Syrdal, "A Magnetic Compass with Cathode-Ray Sensing Element," AIEE Transactions, 1947, vol. 66, pp. 529-534. (Copy Div. 66.)